(12) United States Patent
Kirby et al.

(10) Patent No.: US 10,160,882 B2
(45) Date of Patent: Dec. 25, 2018

(54) FILLERS

(71) Applicant: Polynt Composites USA Inc., Carpentersville, IL (US)

(72) Inventors: Kurt Kirby, Kansas City, MO (US); Owen H. Decker, Smithville, MO (US); Pamela Duncan, Gladstone, MO (US); Jeffrey J. Laven, Liberty, MO (US)

(73) Assignee: Polynt Composites USA, Inc., Carpentersville, IL (US)

( * ) Notice: Subject to any disclaimer, the term of this patent is extended or adjusted under 35 U.S.C. 154(b) by 24 days.

(21) Appl. No.: 14/631,984

(22) Filed: Feb. 26, 2015

(65) Prior Publication Data

US 2016/0251541 A1 Sep. 1, 2016

(51) Int. Cl.

| | |
|---|---|
| *C08K 3/36* | (2006.01) |
| *C08K 9/00* | (2006.01) |
| *C09D 167/07* | (2006.01) |
| *B29C 41/22* | (2006.01) |
| *C08K 5/1535* | (2006.01) |
| *B29C 37/00* | (2006.01) |
| *B29C 70/30* | (2006.01) |
| *B29C 70/58* | (2006.01) |
| *B29K 101/00* | (2006.01) |
| *B29K 105/16* | (2006.01) |
| *B29K 503/04* | (2006.01) |
| *B29L 9/00* | (2006.01) |

(52) U.S. Cl.
CPC ........ *C09D 167/07* (2013.01); *B29C 37/0032* (2013.01); *B29C 41/22* (2013.01); *B29C 70/30* (2013.01); *B29C 70/58* (2013.01); *C08K 3/36* (2013.01); *C08K 5/1535* (2013.01); *B29K 2101/00* (2013.01); *B29K 2105/16* (2013.01); *B29K 2503/04* (2013.01); *B29L 2009/00* (2013.01)

(58) Field of Classification Search
CPC ................................ C09D 167/07; C08K 3/36
USPC .......................... 524/493; 523/200, 216, 513
See application file for complete search history.

(56) References Cited

U.S. PATENT DOCUMENTS

| | | | | |
|---|---|---|---|---|
| 4,781,940 | A | * | 11/1988 | Denton, Jr. ............... C08F 2/44 427/2.14 |
| 5,028,482 | A | * | 7/1991 | Jeffs ......................... C08K 9/08 427/221 |
| 8,906,502 | B2 | | 12/2014 | Bauchet et al. |
| 2003/0114622 | A1 | * | 6/2003 | Masawaki ................. C08J 3/26 526/318 |
| 2003/0170400 | A1 | | 9/2003 | Laver et al. |
| 2006/0155043 | A1 | * | 7/2006 | Johnson ................ B82Y 30/00 524/495 |
| 2006/0165989 | A1 | | 7/2006 | Takikawa |
| 2008/0160307 | A1 | | 7/2008 | Bauchet et al. |
| 2013/0309284 | A1 | | 11/2013 | Matsushita |
| 2016/0222193 | A1 | * | 8/2016 | Bringley ................ A61K 6/027 |

FOREIGN PATENT DOCUMENTS

| | | | |
|---|---|---|---|
| JP | 57148613 A | * | 9/1982 |
| WO | WO1997012945 | | 4/1997 |

OTHER PUBLICATIONS

International Search Report and Written Opinion for PCT/US2016/019526 dated May 20, 2016.

* cited by examiner

*Primary Examiner* — Tae H Yoon
(74) *Attorney, Agent, or Firm* — Neal, Gerber & Eisenberg LLP

(57) ABSTRACT

A powdered filler composed of solid particles of a cured thermosetting composition comprising a resin modifier such as fumed silica, methods of preparing the cured solid particles, compositions comprising the powdered filler, and articles made from the compositions are disclosed. In embodiments, the solid particles are spherical shaped, transparent or translucent, and have a mean particle size of less than 20 μm.

20 Claims, No Drawings

FILLERS

FIELD OF THE INVENTION

The present invention relates to cured resin particles, which can be used as filler in polymer composites, and methods for manufacturing the particles. Gel coat compositions that incorporate resin particles of the invention as a filler provide a cured gel coat that has improved reparability, and improved color stability.

BACKGROUND OF THE INVENTION

Gel coats are widely used in numerous applications as the external surface layer of composite molded articles. Gel coats are typically found on composite articles that are exposed to the environment and must exhibit moisture resistance, resistance to cracking and similar properties, or on composite articles that require a strong, flexible, abrasion and impact-resistant surface and/or a smooth glossy finish. Examples of such articles include boat hulls, bath tub enclosures, pools, spas, and body panels on cars and trucks, among others.

Such gel-coated articles are typically formed by spraying a gel coat composition onto the inside surface of an open mold, applying a fibrous composite material and a laminating resin onto the gel coat, curing the gel coat and laminating resin, then removing the cured, gel-coated article from the mold. Gel-coated articles can also be fabricated by applying the composite materials into a multi-part mold, injecting or applying the gel coat composition, closing the mold, curing the gel coat and then removing the cured, gel-coated article from the mold.

Gel coats for composite articles are typically formulated from a thermosetting base resin system such as unsaturated polyester, acrylate or unsaturated urethane type resin with incorporated fillers, pigments, thixotropic agents, and other additives. The gel coat composition should exhibit low viscosity at high shear to allow for ease of application to the mold, but also resist sagging or running after it is applied. Another important property of gel coats is surface tackiness and cure time. A gel coat desirably has a gel time of 10 to 20 minutes.

It is known to incorporate inorganic and/or organic fillers into gel coat compositions. Organic fillers for incorporation into gel coats have been prepared by two methods. In Bauchet et al, U.S. Pat. No. 8,906,502, organic filler material is cured in large blocks, then ground to the desired particle size. This approach is undesirable because the grinding of cured (cross-linked) thermosetting materials is difficult and costly.

Organic fillers in fine particle form have also been prepared by polymerization of organic resins in aqueous dispersions by Masawaki et al, US 2003/0114622. However, organic particles produced by Masawaki's method are opaque and light colored. Consequently, when incorporated as a filler into a gel coat composition, the particles contribute whiteness and opacity to the gel coat. For example, a black-pigmented gel coat composition incorporating a filler of organic particles produced by the Masawaki process can produce a gel coat that is undesirably grey in color rather than black, with visible white particles dispersed throughout. In gel coats and other applications, it is desirable that a filler impart no color or opacity that can alter the intended color of the material.

SUMMARY OF THE INVENTION

The present invention provides resin blend compositions that may be polymerized in aqueous emulsions or dispersions to produce cured resin fine powders, or particulate fillers, which, in embodiments, have a particle diameter of 10 µm or less, and do not impart color or opacity to alter the intended color of a resin composition or composite material (e.g., gel coats). According to an embodiment, the resin blend composition includes a thermosetting ethylenically unsaturated curable composition, surfactant, curing agent and hydrophilic resin modifier. In embodiments, the hydrophilic resin modifier is a hydrophilic fumed silica.

The present invention also provides a method of preparing cured resin fine powders which, in embodiments, have a particle diameter of 10 µm or less. According to an embodiment, the cured resin fine powder can be prepared by forming an oil-in-water emulsion or dispersion of a resin blend composition comprised of a thermosetting ethylenically unsaturated curable composition, surfactant, curing agent and hydrophilic resin modifier, curing the emulsion or dispersion to form a particle slurry, drying the particle slurry, and reducing the dried material into particles. In embodiments, the resin modifier is a hydrophilic fumed silica.

In embodiments, the resin particles can have a relatively small mean particle size ranging from 0.1 µm to less than 20 µm (e.g., 0.3 µm to 10 µm). In some embodiments, the resin particles can have a relatively large mean particle size ranging from 20 µm to 200 µm (e.g., 100 µm to 200 µm). In embodiments, the resin particles are spherical in shape and transparent or translucent when used as a filler material within a resin matrix.

DETAILED DESCRIPTION OF THE INVENTION

Definitions

Unless stated to the contrary, implicit from the context, or customary in the art, all parts and percentages are based on weight and all test methods are current as of the filing date of this disclosure. For purposes of United States patent practice, the contents of any referenced patent, patent application or publication are incorporated by reference in their entirety (or its equivalent US version is so incorporated by reference), especially with respect to the disclosure of definitions (to the extent not inconsistent with any definitions specifically provided in this disclosure) and general knowledge in the art.

Numerical ranges disclosed herein include all values from, and including, the lower value and the upper value. For ranges containing explicit values (e.g., 1 or 2, or 3 to 5, or 6, or 7) any sub-range between any two explicit values is included (e.g., 1 to 2; 2 to 6; 5 to 7; 3 to 7; 5 to 6; etc.).

The terms "a" or "an," as used herein, are defined as one or more than one. Also, the use of introductory phrases such as "at least one," "at least two," and "one or more" in the claims should not be construed to imply that the introduction of another claim element by the indefinite articles "a" or "an" limits any particular claim containing such introduced claim element to devices, etc., containing only one such element, even when the same claim includes the introductory phrases "one or more" or "at least one" and indefinite articles such as "a" or "an." The same applies to the use of definite articles.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The teen "consisting of" excludes any component, step, or procedure not specifically delineated or listed.

Unless indicated otherwise, the Wt % of components is based on the total weight of the composition.

Embodiments of the invention include cured resin particles, compositions comprising the resin particles, articles produced from the compositions, and methods of preparing the resin particles. In embodiments, the cured resin particles produced according to the method of the invention and used as a filler in a resin composition or composite material are translucent and impart substantially no color or opacity to the resin composition or composite material. In embodiments, black gel coats prepared with the resin particles added as a filler have lightness L values that generally range from 6.0 to 7.2.

With the method of the invention, in embodiments, a cured resin fine powder composed of generally spherical particles with an average diameter of 10 µm or less can be prepared.

According to an embodiment, the cured resin fine powder can be prepared by emulsion polymerization by: forming an oil-in-water emulsion or dispersion of a resin blend composition comprising A) a thermosetting ethylenically-unsaturated curable composition, B) surfactant, C) curing agent, D) optional accelerator, E) hydrophilic resin modifier, and F) optional additives; curing the emulsion or dispersion to form a particle slurry; drying the particle slurry; and reducing the dried material into particles having a desired size. In embodiments, the resin particles have an average diameter of 0.1 to ≤10 µm. In some embodiments, the resin particles have an average diameter of greater than 10 µm, e.g., up to 20 µm, up to 100 µm, and up to 200 µm.

In embodiments, the resin blend composition comprises A) from 75 Wt % up to 98 Wt % of a thermosetting ethylenically-unsaturated curable composition, B) from 0.5 Wt. % up to 5 Wt. % surfactant, C) from 0.5 Wt. % up to 5 Wt. %. of a free-radical initiator (curing agent), D) from 0 Wt. % up to 2 Wt. % accelerator, and E) from 0.5 up to 12 Wt % hydrophilic resin modifier. The Wt % of the foregoing components is based on the total weight of the resin blend composition (without the emulsifying aqueous (e.g., water) component).

A) Thermosetting Ethylenically-Unsaturated Curable Composition.

The thermosetting ethylenically-unsaturated curable composition is comprised of an ethylenically-unsaturated resin, and/or one or more cross-linkable ethylenically-unsaturated monomers, which are capable of curing or crosslinking by free-radical polymerization.

Ethylenically-unsaturated resins for use in the invention include, for example, ethylenically-unsaturated polyester resins, (meth)acrylate resins, epoxy (meth)acrylate resins, and urethane (meth)acrylate resins. In embodiments, the ethylenically-unsaturated curable composition includes from 0 Wt % up to 100 Wt % of an ethylenically-unsaturated resin.

Ethylenically-Unsaturated Polyester Resins.

Ethylenically-unsaturated polyester resins for use in the present invention can be liquid, or can be made liquid by dissolving an ethylenically-unsaturated polyester resin in an ethylenically-unsaturated monomer (e.g., styrene, etc.).

Ethylenically-unsaturated polyester resins can be obtained by condensation polymerization of one or more polyhydric alcohols and one or more α,β-unsaturated dibasic acids and/or anhydrides thereof. In addition to one or more polyhydric alcohols and one or more α,β-unsaturated dibasic acids and/or anhydrides thereof, ethylenically-unsaturated polyester resins may also be prepared from monofunctional, difunctional or polyfunctional saturated dibasic acids and/or anhydrides thereof.

Nonlimiting examples of polyhydric alcohols include neopentyl glycol, ethylene glycol, diethylene glycol, triethylene glycol, propylene glycol, dipropylene glycol, tripropylene glycol, 1,2-butanediol, 1,3-butanediol, 1,4-butanediol, polyethylene glycols, polypropylene glycols, glycerol, mannitol, 1,3-propanediol, 1,6-hexanediol, pentaerythritol, pentaerythritol derivatives such as pentaerythritol diallyl ether, hydrogenated bisphenol A, bisphenol A, hydroxylfunctional bisphenol A derivatives, trimethylolpropane, trimethylolethane, and 2-methyl-2-butyl-1,3-propanediol among others, and mixtures thereof.

Nonlimiting examples of α,β-unsaturated di- or polycarboxylic acids and/or anhydrides thereof include maleic acid, fumaric acid, itaconic acid, citraconic acid, chloromaleic acid, allylsuccinic acid, mesaconic acid, among others, and their anhydrides, and mixtures thereof.

Nonlimiting examples of saturated mono-, di- or polycarboxylic acids and/or anhydrides thereof include: benzoic acid, acetic acid, acetic anhydride, isophthalic acid, orthophthalic acid, terephthalic acid, adipic acid, succinic acid, succinic anhydride, sebacic acid, 1,3-cyclohexanedicarboxylic acid, 1,4-cyclohexanedicarboxylic acid, phthalic anhydride, tetrahydrophthalic anhydride, methyltetrahydrophthalic anhydride, endomethylenetetrahydrophthalic anhydride, tetrabromophthalic anhydride, hexahydrophthalic anhydride, trimellitic acid, trimellitic anhydride, and the like, and mixtures thereof.

The production of ethylenically-unsaturated polyester resins by blending an ethylenically-unsaturated polyester resin and a polymerizable monomer having ethylenic α,β-unsaturated double bonds (e.g., styrene, etc.) is well-known to those skilled in the art. Additionally, many suitable ethylenically-unsaturated polyester resins are commercially available from resin manufacturers, such as POLYNT Composites US.

(Meth)Acrylate Resins.

(Meth)acrylate ester resins for use in the present invention can be prepare by condensation of methacrylic acid or acrylic acid, or blends of methacrylic and acrylic acid with polyhydric alcohols as described above herein to make methacrylic, acrylic or mixed methacrylic/acrylic esters. (Meth)acrylate ester resins may also be prepared by condensation of methacrylic acid or acrylic acid, or blends of methacrylic and acrylic acid with polymeric polyhydric alcohols such as polyester polyols and/or polyether polyols.

Epoxy (Meth)Acrylate Resins.

In another embodiment, the thermosetting ethylenically-unsaturated resin is an epoxy acrylate or methacrylate ester resin, e.g. an epoxy (meth)acrylate ester resin. Epoxy (meth)acrylate ester resins for use in the present invention can be obtained by an addition reaction between acrylic acid or methacrylic acid and an epoxy resin having at one or more epoxy groups per molecule. Such epoxy (meth)acrylate ester resins may be further modified by dissolving them in one or more polymerizable monomers having an ethylenic α,β-unsaturated double bond as described hereinabove (e.g., styrene).

Examples of epoxy resins having one or more epoxy groups per molecule include glycidyl ethers of various bisphenols, such as bisphenol A, bisphenol F, bisphenol S or the like, or a derivative thereof; bixylenol-type epoxy resins derived from bixylenol or a derivative thereof; biphenol-type epoxy resins derived from biphenol or a derivative thereof; naphthalene-type epoxy resins derived from naphthalene or a derivative thereof; and epoxy resins such as novolak-type epoxy resins. Epoxy resins can be used alone or in combination.

Urethane (Meth)Acrylate Resins.

Urethane (meth)acrylate resin for use in the present invention can be obtained by dissolving a urethane-containing molecule having one or more (meth)acrylate groups in one or more polymerizable monomers having an ethylenic $\alpha,\beta$-unsaturated double bond as described hereinabove (e.g., styrene).

In embodiments, a urethane (meth)acrylate can be obtained by reacting a polyalcohol and/or a polyester polyol and/or a polyether polyol with a diisocyanate to introduce an isocyanate group at the end of the molecule, and then reacting with an acrylate or methacrylate having an alcoholic hydroxyl group. In other embodiments, a urethane (meth)acrylate can be obtained by first reacting an acrylate or methacrylate having an alcoholic hydroxyl group with an isocyanate so as to leave behind the isocyanate group, and then reacting the isocyanate group with a polyalcohol and/or a polyester polyol and/or a polyether polyol. Urethane methacrylates can also be obtained by reacting an amine with a carbonate to make a urethane polyol analogous to the other alcohols listed above, then further reacting this alcohol, or blends of this alcohol with other alcohols and with unsaturated acids or saturated acids, or their anhydrides.

Ethylenically-Unsaturated Monomers.

Ethylenically-unsaturated monomers are polymerizable monomers having an ethylenic $\alpha,\beta$-unsaturated double bond. Such monomers are capable of copolymerizing with an ethylenically-unsaturated resin via free radical polymerization. In embodiments, the thermosetting ethylenically-unsaturated curable composition comprises a blend of one or more ethylenically-unsaturated monomers alone, or in combination with one or more of ethylenically-unsaturated polyester resins, (meth)acrylate resins, epoxy (meth)acrylate resins, and urethane (meth)acrylate resins. Examples of polymerizable ethylenically-unsaturated monomers include styrene, o-, m-, p-methyl styrene, t-butylstyrene, vinyltoluene, vinyl acetate, butyl acrylate, butyl methacrylate, methyl acrylate, methyl methacrylate, ethyl methacrylate, divinyl benzene, diallyl phthalate, diallyl isophthalate, triallyl cyanurate, diallyl tetrabromophthalate, phenoxyethyl acrylate, 1,4-butanediol diacrylate, 1,4-butanediol dimethacrylate, 1,6-hexanediol diacrylate, 1,6-hexanediol dimethacrylate, trimethylolpropane triacrylate, trimethylolpropane trimethacrylate, tripropyleneglycol diacrylate, 2-hydroxyethyl acrylate, 2-hydroxypropyl methacrylate, neopentyl glycol dimethacrylate, butyl vinyl ether, 1,4-butanediol divinyl ether, dimethyl maleate, and diethyl fumarate, among others, and mixtures thereof. In embodiments, the thermosetting ethylenically-unsaturated curable composition includes from 0 Wt % up to 100 Wt % of an ethylenically-unsaturated monomer.

B) Surfactants.

The resin blend composition includes a surfactant to enhance the stability of the emulsion or dispersion. Surfactants useful in the invention include non-ionic surfactants such as polyoxyethylene glycol sorbitan alkyl esters (e.g., polyoxyethylene (20) sorbitan monolaurate (Polysorbate 20)), sorbitan alkyl esters, polyoxyethylene glycol alkyl ethers (e.g., octaethylene glycol monododecyl ether), polyoxypropylene glycol alkyl ethers, polyoxyethylene glycol alkylphenol ethers (e.g., nonoxynol-9), polyoxyethylene glycol octylphenol ethers (e.g., Triton X-100), and nonionic difunctional block copolymers (e.g., polyoxyethylene propylene ethers such as Pluronic® L61), among others; cationic surfactants such as quaternary ammonium salts, among others; and anionic surfactants such as alkyl sulfates (e.g., ammonium lauryl sulfate, sodium lauryl sulfate, sodium dodecyl sulfate (SDS), and sulfonates, among others. Surfactants can be used alone or in combination.

C) Curing Agent.

The resin blend composition further includes a curing agent. Compounds that generate free radicals, and thereby initiate the polymerization of the thermosetting resin and/or the ethylenically unsaturated monomers, may be used as curing agents in compositions of the invention, and include organic peroxides, persulfides, perborates, percarbonates, and azo compounds. Non-limiting examples of these curing agents, or initiators, include benzoyl peroxide (BPO), t-butyl peroxybenzoate (TBPB), lauroyl peroxide, di-t-butyl peroxide, dicumyl peroxide, diisopropyl peroxide carbonate, t-butyl peroxy-2-ethylhexanoate, methyl ethyl ketone peroxide, 1,1-bis(t-hexylperoxy)-3,3,5-trimethylcyclohexane, cumene hydroperoxide, t-butyl hydroperoxide, bis(4-t-butylcyclohexyl)peroxydicarbonate, 2,2'-azo-bis-isobutyronitrile, dimethyl 2,2'-azobisisobutyrate, 2,2'-azobis(2,4-dimethyl)valeronitrile, and 2,2'-azobisisotolylamide, among others. Free-radical initiators can be used alone or in combination.

D) Accelerators.

An accelerator can be used as desired in combination with the curing agent (free-radical initiator) to control the rate of curing. Such accelerators are commonly known and used in the art. Accelerators commonly used in curing of ethylenically-unsaturated curable compositions include, for example: a metal salt of an organic acid (a metallic soap) such as cobalt naphthenate; a tertiary amine such as N,N-diethylaniline, N,N-dimethylaniline or N,N-dimethyl-paratoluidine; or ferrocene. In embodiments utilizing a ketone peroxide (e.g., methyl ethyl ketone peroxide) or a hydroperoxide (e.g., cumene hydroperoxide) curing agent, a metallic soap such as cobalt naphthenate can be used as an accelerator. In embodiments in which the curing agent is a diacyl peroxide (e.g., benzoyl peroxide), a common accelerator is a tertiary amine (e.g. N,N-diethylaniline). In embodiments using a peroxycarbonate curing agent (e.g., bis(4-t-butylcyclohexyl)peroxydicarbonate), ferrocene can be used as an accelerator.

E) Hydrophilic Resin Modifier.

The resin blend composition further includes a particulate hydrophilic resin modifier. In embodiments, the hydrophilic resin modifier in combination with the thermosetting ethylenically unsaturated curable composition (resin or crosslinkable monomer blend), surfactant and curing agent, imparts a translucence to the cured resin particles such that the particles cause substantially no color change when added as a filler to a thermosetting resin composition or composite material. In embodiments, the resin modifier in combination with the thermosetting ethylenically-unsaturated curable composition (resin or crosslinkable monomer blend), surfactant and curing agent, imparts a fragility to the cured, dry resin particle agglomerates such that the agglomerates are easily broken down into primary cured dry particles. In embodiments, the resin modifier is a hydrophilic fumed silica. Fumed silicas are generally white, fine, light powders consisting of particles that can range from 7 to 40 nm in size, depending on the grade, with the particles being linked into loose aggregates ranging in size from 0.5 to 44 µm. Hydrophilic fumed silicas are commercially available, for example, under the tradenames Aerosil® (Evonik Corporation, N.J., USA), Cab-O-Sil® (Cabot Corporation, MA, USA). In embodiments, the amount of the resin modifier in the resin blend composition can range from 0.5 Wt. %, or from 1 Wt. %, or from 2 Wt. %, or from 2.5 Wt. %, up to 12 Wt. %, up to 7 Wt. %, or up to 5 Wt. %.

In general, the mean particle size of the cured resin particles of the invention decreases as the amount of the resin modifier (e.g., fumed silica) included in the resin blend composition increases. By way of example, in the production of resin particles with a relatively small mean particle size of <20 µm, or ≤10 µm (e.g., 1 to 7 µm), the resin blend composition (without the aqueous component) can include from 2.5 to 7 Wt. % (e.g., 3 to 5 Wt. %) of fumed silica. In another example, in producing resin particles with a relatively large mean particle size of 25 µm or more (e.g., 100 to 200 µm), the resin blend composition (without the aqueous component) can include a lesser amount of fumed silica at 1 to 2.4 Wt. %.

F) Additives.

The resin blend composition for preparing the resin particles can further include one or more optional additives known to the art to adjust or enhance the properties of the resin particles. Such additives include, for example, light stabilizers, pigments, and plasticizers, among others.

Resin Particle Preparation.

According to an embodiment, the cured resin fine powder can be prepared by mixing together the thermosetting ethylenically-unsaturated curable composition, surfactant(s), hydrophilic resin modifier (e.g., fumed silica), and curing agent (e.g., free-radical initiator) and optional accelerator and/or additives, to form a resin blend composition. The resin blend composition can then be emulsified in an aqueous medium to uniformly disperse the components in the aqueous phase to form an oil-in-water dispersion or emulsion. The aqueous medium can be, for example, ion exchange water, distilled water or tap water. In embodiments, the resin blend composition can be combined with the aqueous component (e.g., water) in a w/w ratio of 60:40 to 1:99. The minimum Wt % of the aqueous component is defined by the amount required to produce an oil-in-water dispersion or emulsion. The maximum Wt % of the aqueous component is, in principle, very large (i.e, >99 Wt %), but practical considerations restrict the aqueous content in embodiments to no more than about 90 Wt %.

In embodiments, the oil-in-water emulsion or dispersion can be prepared by adding the curing agent to the emulsion in advance of curing, with the accelerator added, if needed, to the emulsion or dispersion at the time of curing. In other embodiments, the curing agent can be added when the emulsion or dispersion is cured.

The oil-in-water resin emulsion or dispersion can be cured at reduced temperature (e.g., 0° C. to 20° C.), or at ambient temperature (e.g., 20° C. to 30° C.), or with heating, for 0.5 to 24 hours (e.g., 2 hours). Upon completion of the cure, the resulting particle slurry can then be dried, for example, at 50 to 150° C. (e.g., 70° C.) for 4 to 24 hours (e.g., 16 hours), resulting in a chunky, but friable agglomerate that breaks down readily to a fine powder of cured resin particles. The resulting cured particles are white in appearance in air, but are translucent when suspended in organic solvents, organic resins, and the like. Microscopic analysis discloses that the cured particles are generally spherical in shape (i.e., not fractured).

The friable agglomerates of dried powder comprising the cured particles may be incorporated into compositions directly, or may first be screened, using, for example, a 35 to 150 mesh sieve screen, to remove hard agglomerations and/or fragments of non-emulsified resin.

In embodiments, the friable agglomerates of dried powder can be reduced in size (e.g., by gentle grinding or shredding, etc.) to produce a powder of the primary particles formed in the dispersion or emulsion. The primary spherical particles may be further reduced in size (e.g., by high intensity grinding) if required.

Mean Particle Size.

In embodiments, the resin particles have a relatively small mean particle size of less than 20 µm, or less than or equal to 10 µm, or less than or equal to 5 µm, and at least 0.001 µm, or at least 0.01 µm, or at least 0.1 µm, or at least 1 µm. In some embodiments, the resin particles have a relatively large mean particle size of greater than 20 µm, or 30 µm or greater, or 50 µm or greater, or 80 µm or greater, up to 200 µm. Resin powders of the invention having an average particle size up to 65 µm are visually non-differentiable when incorporated into a resin composition or composite material (e.g., gel coat composition).

Lightness (L Value).

In embodiments, the cured resin particles dispersed in a resin matrix add substantially no color or opacity to the cured composition or composite material, and have little effect on the color of a pigmented composition. In embodiments, the cured resin particles in a cured composition or composite material are translucent and visually non-differentiable from the resin matrix. In embodiments, the addition of up to 20 Wt. % of the cured resin particles causes a darkness color change (ΔL) of less than 2.0 units when added to a typical black-pigmented composition, indicating substantial translucency. L values range from L=0 indicating an opaque black color, to L=100 indicating an opaque white color. The "L value" of a coating film or pigmented article may be measured using a color spectrophotometer, such as a model SF600 spectrophotometer commercially available from Datacolor International, Lawrenceville, N.J.

Applications.

In use, the resin powder of the invention can be used as a filler in gel coat compositions, and other resin compositions and composite materials such as resins for hand lay-up, laminating, infusion, vacuum infusion, resin transfer molding, sheet molding compound, bulk molding compound, and pultrusion, and the like. The resin powder can be used as a full or partial replacement for conventional, typically used mineral fillers composed, for example, of aluminum trihydrate, barium sulfate, calcium carbonate, talc, and clay, among others. The resin powder may be used as fillers or modifiers of paints, liquid coatings, and powder coatings. The resin powder may be used in thermoplastic and thermoset molded articles.

Gel Coat Compositions.

Gel coat compositions are typically pigmented, filled resins that are formulated for use in ambient temperature, open mold processes. Formulations for gel coats are described and known in the art. Gel coat compositions are typically formulated from thermosetting resins such as unsaturated polyesters, acrylates, and urethane resins. Gel coat compositions typically include one or more additive components, for example, fillers, pigments, dyes and thixotropic agents, and other additives such promoters, stabilizers, extenders, wetting agent, leveling agents, air release agents, and inhibitors as practiced in the art to adjust and enhance the molding properties (e.g., color effect, sprayability, sag resistance, mechanical property consistency, etc.). Gel coat compositions also include a crosslinking agent. Gel coats are typically free of fibers.

In an embodiment, a gel coat composition can be prepared by high speed dispersion of the cured resin particle filler of the invention, thixotropic agent and pigments/dyes into a thermosetting resin. Ethylenically-unsaturated monomer (e.g., styrene, (meth)acrylic monomer, etc.) can be added to provide the desired viscosity. A free radical initiator can be added which will facilitate the formation of free radicals for curing the gel coat composition.

In embodiments, a gel coat composition can include from 1 Wt. %, or from 5 Wt. %, or from 10 Wt. %, up to 20 Wt. %, or up to 25 Wt. %, or up to 40 Wt. %, or up to 50 Wt. %, of the resin particles of the invention as a filler component, based on the total weight of the gel coat composition. In applications in which it is desired that no color or opacity is imparted to the gel coat composition (or other resin composition), it is desirable to utilize resin particles having an average particle size of less than 20 μm, or less than 10 μm, which can be added to the resin composition in an amount of 1 up to 20 Wt. % based on the total weight of the gel coat composition.

In some applications, it can be desirable to formulate the gel coat (or other composite material) with a blend of fillers composed of the resin filler of the invention and an inorganic filler. Examples of inorganic fillers include clay, magnesium oxide, magnesium hydroxide, calcium carbonate, calcium silicate, mica, aluminum hydroxide, barium sulfate, talc, and the like. In embodiments, 25 to 100 Wt. % of the total weight of a filler in a gel coat composition can be the resin particles of the invention, with the remaining balance of filler being an inorganic filler. As such, the resin particles of the invention can be used as a filler in a gel coat or other composite composition as a replacement for all or part of an inorganic filler that is typically or conventionally used in a gel coat or other composite.

Pigments, if used, can be incorporated into the gel coat composition as pastes prepared by using grinding resins or pigment dispersants according to methods well known in the art. Suitable pigments include compounds such as titanium oxide, iron oxide, carbon black, and phthalocyanine blue, among others.

Rheological properties of gel coats are precisely controlled in view of the thickness of the deposited film and the tendency of such films to sag within the mold. Gel coat compositions are formulated to be thixotropic, that is, have a viscosity that is dependent on shear rate. The thixotropic behavior is obtained by the inclusion of thixotropic agents, which form a network with the thermosetting resin (e.g., polyester polymer) through hydrogen bonding. During high shear, the network breaks down and lowers the viscosity of the gel coat composition. After the high shear is relieved, the network reforms, or recovers, and the viscosity of the gel coat composition increases. If high shear force is again applied, the viscosity of the material decreases. By virtue of the thixotropic agent, gel coat compositions have a low viscosity under high shear forces, which allows the composition to be stirred, pumped, sprayed and spread easily. Under low shear and once deposited onto a mold, the viscosity increases over time and the gel coat composition recovers to a high viscosity to prevent sagging and running when applied to vertical surfaces. Upon curing, the composition solidifies to a hard surface.

Gel coat compositions are typically applied (with an initiator) onto the inside surface of an open mold by brushing or spraying from a high pressure (high shear) spray gun to a typical film thickness of up to 40 mils (1.0 mm thick). The film is partially cured prior to placement of a composite material onto the gel coat layer and a laminating resin, followed by curing of the gel coat composition and laminating resin to form a composite article, and removal of the gel coated, cured article from the mold. The cured gel coat is an integral part of the finished product, providing a durable and cosmetically-appealing finish to the exterior surface of the article.

In embodiments, the partially cured film is relatively soft and can be tacky. In embodiments, the composite material placed onto the gel coat layer is a reinforcing material such as glass fibers, glass fiber matt, polyethylene fibers, carbon fibers, metal fibers, ceramic fibers, aramid fibers, etc. Examples of laminating resins include polyester resins, epoxy resins, polycarbonate resins, polystyrene resins, polymethyl-methacrylate resins, etc. In embodiments, the mold surface can correspond to the shape of the desired article in negative relief, and can be an open mold or a matched mold.

Other Applications.

For applications such as non-skid coatings, the resin powders used as fillers can be prepared having a large particle size, for example a mean particle size ranging from 100 to 200 μm. Particles may be incorporated into curable resinous systems subject to shrinkage during cure to minimize cure shrinkage and cure-shrinkage stresses and defects. Such resinous systems include resins for hand lay-up, laminating, infusion, vacuum infusion, resin transfer molding, sheet molding compound, bulk molding compound, and pultrusion, and the like. They further include paints, liquid coatings, and powder coatings. Particles may also be used in thermoplastic and thermoset molded articles.

Specific Embodiments

The following examples are provided to illustrate various embodiments of the invention. They are not intended to limit the invention as otherwise described and claimed. All numerical values are approximate.

Materials.

Resin: 0400889, an ethylenically-unsaturated thermosetting resin manufactured by POLYNT Composites US, North Kansas City, Mo. Resin 0400889 is a solution of a polyester of propylene glycol, neopentyl glycol, isophthalic acid, and maleic anhydride dissolved in 40 Wt. % styrene monomer.

Resin: 0402783, an ethylenically-unsaturated thermosetting resin manufactured by POLYNT Composites US, North Kansas City, Mo. Resin 0402783 is a solution of a polyester of propylene glycol and maleic anhydride dissolved in 32 Wt. % styrene monomer.

Resin: 0460100, an ethylenically-unsaturated thermosetting resin manufactured by POLYNT Composites US, North Kansas City, Mo. Resin 0460100 is an epoxy methacrylate ester dissolved in 30 Wt. % styrene monomer.

Surfactant: TWEEN® 20 a nonionic polysorbate surfactant, manufactured by Croda Inc. of Edison, N.J.

Free-radical initiator: Benox® B50 dibenzoyl peroxide (50% active), manufactured by United Initiators, Inc. of Elyria, Ohio.

Free-radical initiator: Vazo 64, (2,2'-Azobisisobutyronitrile), manufactured by E. I. DuPont de Nemours, of Wilmington, Del.

Accelerator: N,N-dimethyl para-toluidine, manufactured by Aceto Corp. of Lake Success, N.Y.

Hydrophilic resin modifiers: AEROSIL® hydrophilic fumed silica, grades OX50, 200 and 380, manufactured by Evonik Industries of Parsippany, N.J.

Styrene: Manufactured by Lyondell Corp. of Houston, Tex.

Methyl Methacrylate: Manufactured by Arkema, Philadelphia, Pa.

12% Cobalt Napthenate: Manufactured by OMG Americas, Cleveland, Ohio.

Ethylene Glycol: Manufactured by Indorama Ventures, Northbrook, Ill.

Trimethylolpropane trimethacrylate: Manufactured by Sartomer Corporation of Exton, Pa.

Air Release Agent: A 560, manufactured by BYK of Wallington, Conn.

Talc: Manufactured by Barrets Mineral, Inc. of Dillon, Mont.

Aluminum Trihydroxide: Manufactured by J.M. Huber of Fairmont, Ga.

Black Pigment Paste: Manufactured by American Colors Inc., Sandusky, Ohio.

Comparative Example 1—Mechanically-Crushed Resin Particles

Mechanically crushed resin particles of the composition set forth below were prepared as described in U.S. Pat. No. 8,906,502 (Bauchet). The resin solution was cured and then broken into small pieces of about 1 inch square. The pieces were then ground to powder to a maximum particle size of 45 μm with a hammer mill.

| Component | Quantity in Parts by Weight (pbw) |
| --- | --- |
| Resin 0400889 | 98.4 |
| Benzoyl Peroxide (50% active) | 1.50 |
| N,N-dimethyl para-toluidine | 0.10 |
| Total Solids | 100 |

Comparative Example 2

Preparation of Cured Resin Fine Powders by Dispersion

Cured resin particles of the composition set forth below were prepared as described in US 2003/0114622 (Masawaki).

| Component | Quantity (pbw) |
| --- | --- |
| Resin 0400889 | 94.9 |
| TWEEN ® 20 nonionic surfactant | 2.0 |
| Benzoyl Peroxide (50% active) | 3.0 |
| N,N-dimethyl para-toluidine | 0.15 |
| Total Solids | 100 |
| Water | 120 |

Processing of Inventive Examples 3-9

Inventive Examples 3-9 were prepared by emulsion polymerization or suspension polymerization using an Indco Benchtop High Speed Disperser equipped with a Type CD3 blade. Ethylenically-unsaturated curable composition, initiator, surfactant and hydrophilic silica were introduced at room temperature into a metal quart can and mixed at 500 to 1000 rpm to fully incorporate the ingredients. Mixer speed was increased to 2400 rpm prior to water addition. Water was added slowly to the mixer to emulsify the resin/additives mixture. The mixer was slowed to 500-1000 rpm, whereupon N,N-dimethyl para-toluidine (as a 10% solution in styrene) was added and allowed to incorporate. The temperature of the emulsion after mixing, and before the cure exotherm was 0 to 30° C. The emulsion was removed from the disperser, and allowed to cure. The cure is exothermic. Ultimate cure temperature depends on the initial temperature, on the thermal mass of each preparation, and on the type and amount of reactive groups in each preparation. Exotherms between 30 and 50° C. were typically observed. After the exotherm peaked and temperature began to decline, the particle slurries were poured into aluminum trays and dried in a forced air oven. Drying could be accomplished at oven temperatures between about 50 and about 150° C., but the temperature was typically about 70° C. The cured, dried particles were sieved using U.S. standard sieve screens of 35 mesh to remove large agglomerations or chunks of un-emulsified resin. The size of the cured particles was measured using a Silas 990 laser diffraction particle size analyzer.

Example 3—Inventive Resin Particles

Resin particles were prepared with ingredients similar to those described in US 2003/0114622 (Masawaki et al.) but with the addition of fumed silica as a resin modifier prior to the emulsion formation. Solids concentration in this example was 42%. Cured particles resulting from this example were substantially spherical in shape, and had a particle size ranging from about 0.1 μm to about 10 μm.

| Component | Quantity (pbw) |
| --- | --- |
| Resin 0400889 | 92.3 |
| TWEEN ® 20 nonionic surfactant | 1.8 |
| Benzoyl Peroxide (50% active) | 2.6 |
| AEROSIL ® 200 hydrophilic fumed silica | 3.1 |
| N,N-dimethyl para-toluidine | 0.13 |
| Total solids (pbw) | 100.0 |
| Water (pbw) | 138.5 |

Example 4—Inventive Resin Particles, Low Silica

Resin particles were prepared as in Inventive Example 3, but with the incorporation of a low level of fumed silica hydrophilic resin modifier. Cured particles resulting from this example were substantially spherical in shape, and had a particle size ranging from about 0.1 μm to about 10 μm.

| Component | Quantity (pbw) |
| --- | --- |
| Resin 0400889 | 93.2 |
| TWEEN ® 20 nonionic surfactant | 1.9 |
| Benzoyl Peroxide (50% active) | 2.7 |
| Aerosil 380 fumed silica | 2.0 |
| N,N-dimethyl para-toluidine | 0.13 |
| Total solids | 100.0 |
| Water | 139.9 |

Example 5—Inventive Resin Particles, High Silica

Resin particles were prepared as in Inventive Example 3, but with the incorporation of a high level of fumed silica. Cured particles resulting from this example were substantially spherical in shape, and had a particle size ranging from about 0.1 μm to about 10 μm.

| Component | Quantity (pbw) |
| --- | --- |
| Resin 0400889 | 84.6 |
| TWEEN ® 20 nonionic surfactant | 1.7 |
| Benzoyl Peroxide (50% active) | 2.4 |
| Aerosil OX50 hydrophilic fumed silica | 11.2 |
| N,N-dimethyl para-toluidine | 0.12 |
| Total Solids | 100 |
| Water | 126.9 |

Example 6—Inventive Resin Particles: Low Solids

Resin particles were prepared as in Inventive Example 3, but at low solids concentration in the emulsion. Solids concentration was about 10 Wt % in this example. Cured particles resulting from this example were substantially spherical in shape, and had a particle size ranging from about 0.1 μm to about 10 μm.

| Component | Quantity (pbw) |
| --- | --- |
| Resin 0400889 | 92.3 |
| TWEEN ® 20 nonionic surfactant | 1.8 |
| Benzoyl Peroxide (50% active) | 2.6 |
| AEROSIL ® 200 hydrophilic fumed silica | 3.1 |
| N,N-dimethyl para-toluidine | 0.13 |
| Total Solids | 100 |
| Water | 900 |

Example 7—Inventive Resin Particles: High Solids

Resin particles were prepared as in Inventive Example 3, but at high solids concentration in the emulsion. To prevent sintering of the particles during cure, this preparation was cooled to 1° C. before addition of the N,N-dimethyl para-toluidine initiator. Solids content was about 52 Wt % in this example. Cured particles resulting from this example were substantially spherical in shape, and had a particle size ranging from about 0.1 μm to about 10 μm.

| Component | Quantity (pbw) |
| --- | --- |
| Resin 0402783 | 54.64 |
| Styrene Monomer | 37.66 |
| TWEEN ® 20 nonionic surfactant | 1.82 |
| Benzoyl Peroxide (50% active) | 2.73 |
| AEROSIL ® 200 hydrophilic fumed silica | 3.01 |
| N,N-dimethyl-para-toluidine | 0.14 |
| Total solids | 100.0 |
| Water | 92.4 |

Example 8—Inventive Resin Particles: Alternate Free-Radical Initiator

Resin particles were prepared as in Inventive Example 3, but with formulation and processing changes: Benzoyl peroxide in the formula was replaced with 2,2'-Azobis-isobutyronitrile (Vazo 64), and the aromatic amine was omitted. After its formation, the emulsion was heated in a 65° C. oven to promote decomposition of the Vazo 64, thereby initiating cure of the composition.

| Component | Quantity (pbw) |
| --- | --- |
| Resin 0400889 | 93.68 |
| TWEEN ® 20 nonionic surfactant | 1.87 |
| Vazo 64 | 1.36 |
| AEROSIL ® 200 hydrophilic fumed silica | 3.09 |
| Total solids | 100.0 |
| Water | 140.0 |

Example 9—Inventive Resin Particles: Ethylenically-Unsaturated Monomers

Resin particles were prepared as in Inventive Example 3 using only ethylenically-unsaturated monomers in the curable composition.

| Component | Quantity (pbw) |
| --- | --- |
| Trimethylolpropane trimethacrylate | 91.26 |
| Styrene | 1.17 |
| TWEEN ® 20 nonionic surfactant | 1.83 |
| Benzoyl Peroxide (50% active) | 2.60 |
| AEROSIL ® 200 hydrophilic fumed silica | 3.01 |
| N,N-dimethyl-para-toluidine | 0.13 |
| Total solids | 100 |
| Water | 137 |

Comparative Example 10, Gel Coat Control without Filler

A gel coat without added organic particles was prepared as described in Example 3 of US 2008/0160307 (Bauchet), by blending the following ingredients:

| Component | Quantity (pbw) |
| --- | --- |
| Resin 0460100 | 77.33 |
| AEROSIL ® 200 hydrophilic fumed silica | 2.22 |
| Styrene | 5.56 |
| Methyl Methacrylate | 5.56 |
| Air Release | 0.56 |
| 12% Cobalt | 0.22 |
| Ethylene glycol | 0.22 |
| Black Pigment Paste | 8.33 |
| TOTAL | 100.0 |

The resulting gel coat compositions had a Brookfield viscosity of 18000-20000 cps at 4 rpm at 77° C., and a thixotropic index of 5.0-7.0. The gel coat was catalyzed with 1.8% methyl ethyl ketone peroxide (MEKP) and spray-applied to glass plates to obtain a film about 0.6 mm thick. The film had a gel time of about 15 minutes at 24° C. and a cure time of about 60 minutes at 21° C. It was allowed to gel, then was backed with a catalyzed glass/polyester laminate and allowed to cure to a composite panel. Samples were cut from this panel and tested for color and for gloss after buff-back. Data from these tests is collected in Table 1: Gel Coat Data.

Comparative Example 11, Gel Coat Control with Mineral Filler

A gel coat control with standard mineral filler was prepared as described in Example 3 of US 2008/0160307 (Bauchet), by blending the following ingredients:

| Component | Quantity (pbw) |
| --- | --- |
| Resin 0460100 | 76.56 |
| *Talc | 25.47 |
| *Aluminum Tri-Hydroxide | 9.75 |
| AEROSIL ® 200 hydrophilic fumed silica | 2.20 |
| Styrene Monomer | 5.66 |
| Methyl Methacrylate | 5.81 |
| Air Release | 0.58 |
| 12% Cobalt | 0.23 |
| Ethylene glycol | 0.23 |
| Black Pigment Paste | 8.72 |
| TOTAL (without fillers) | 100.0 |
| TOTAL (with fillers*) | 135.21 |

The resulting gel coat compositions had a Brookfield viscosity of 18000-20000 cps at 4 rpm at 77° C., and a thixotropic index of 5.0-7.0. The gel coat was catalyzed with 1.8% methyl ethyl ketone peroxide (MEKP) and spray-applied to glass plates to obtain a film about 0.6 mm thick. The film had a gel time of about 15 minutes at 24° C. and a cure time of about 60 minutes at 21° C. It was allowed to gel, then was backed with a catalyzed glass/polyester laminate and allowed to cure to a composite panel. Samples were cut from this panel and tested for color and for gloss after buff-back. Data is from these tests is collected in Table 1: Gel Coat Data.

Comparative Example 12, Gel Coat Control with Crushed Organic Filler

A gel coat control was prepared using the crushed organic filler of Comparative Example 1 as taught by US 2008/0160307 (Bauchet) by blending the following ingredients:

| Component | Quantity (pbw) |
| --- | --- |
| Resin 0460100 | 76.56 |
| *Crushed organic filler, Comp. Ex. 1 | 11.00 |
| AEROSIL ® 200 hydrophilic fumed silica | 2.20 |
| Styrene Monomer | 5.66 |
| Methyl Methacrylate | 5.81 |
| Air Release | 0.58 |
| 12% Cobalt | 0.23 |
| Ethylene glycol | 0.23 |
| Black Pigment Paste | 8.72 |
| TOTAL (without fillers) | 100.0 |
| TOTAL (with filler*) | 111.00 |

The resulting gel coat compositions had a Brookfield viscosity of 18000-20000 cps at 4 rpm at 77° C., and a thixotropic index of 5.0-7.0. The gel coat was catalyzed with 1.8% methyl ethyl ketone peroxide (MEKP) and spray-applied to glass plates to obtain a film about 0.6 mm thick. The film had a gel time of about 15 minutes at 24° C. and a cure time of about 60 minutes at 21° C. It was allowed to gel, then was backed with a catalyzed glass/polyester laminate and allowed to cure to a composite panel. Samples were cut from this panel and tested for color and for gloss after buff-back. Data is from these tests is collected in Table 1: Gel Coat Data.

Comparative Example 13, Gel Coat Control with Spherical Organic Filler

A gel coat control was prepared using spherical organic particles of Comparative Example 2 by blending the following ingredients:

| Component | Quantity (pbw) |
| --- | --- |
| Resin 0460100 | 76.56 |
| *Spherical organic filler, Comp. Ex. 2 | 11.00 |
| AEROSIL ® 200 hydrophilic fumed silica | 2.20 |
| Styrene Monomer | 5.66 |
| Methyl Methacrylate | 5.81 |
| Air Release | 0.58 |
| 12% Cobalt | 0.23 |
| Ethylene glycol | 0.23 |
| Black Pigment Paste | 8.72 |
| TOTAL (without fillers) | 100.0 |
| TOTAL (with filler*) | 111.00 |

The resulting gel coat compositions had a Brookfield viscosity of 18000-20000 cps at 4 rpm at 77° C., and a thixotropic index of 5.0-7.0. The gel coat was catalyzed with 1.8% methyl ethyl ketone peroxide (MEKP) and spray-applied to glass plates to obtain a film about 0.6 mm thick. The film had a gel time of about 15 minutes at 24° C. and a cure time of about 60 minutes at 21° C. It was allowed to gel, then was backed with a catalyzed glass/polyester laminate and allowed to cure to a composite panel. Samples were cut from this panel and tested for color and for gloss after buff-back. Data is from these tests is collected in Table 1: Gel Coat Data.

Inventive Examples 14-21 Using Inventive Organic Particles

A set of inventive gel coats were prepared using the milled organic fillers of Inventive Examples 3-9 by blending the following ingredients:

| Component | Quantity (pbw) |
| --- | --- |
| Resin 0460100 | 76.56 |
| *Spherical organic filler, Inventive Ex. 3-9 | 11.00 |
| AEROSIL ® 200 hydrophilic fumed silica | 2.20 |
| Styrene Monomer | 5.66 |
| Methyl Methacrylate | 5.81 |
| Air Release | 0.58 |
| 12% Cobalt | 0.23 |
| Ethylene glycol | 0.23 |
| Black Pigment Paste | 8.72 |
| TOTAL (without fillers) | 100.0 |
| TOTAL (with filler*) | 111.00 |

The resulting gel coat compositions had Brookfield viscosities of 18000-20000 cps at 4 rpm at 77° C., and thixotropic indices of 5.0-7.0. These gel coats were catalyzed with 1.8% methyl ethyl ketone peroxide (MEKP) and spray-applied to glass plates to obtain a film about 0.6 mm thick. The film had a gel time of about 15 minutes at 24° C. and a cure time of about 60 minutes at 21° C. They were allowed to gel, then were backed with catalyzed glass/polyester laminates and allowed to cure to composite panels. Samples were cut from these panels and were tested for color and for gloss after buff-back. Data is from these tests is collected in Table 1: Gel Coat Data.

Cured gel coat films were evaluated using a Datacolor SF600 Plus—CT spectrophotometer. L values are obtained for the films as a representation of jetness. The L value scale ranges from L=100 representing white, to L=0 representing black. The lower the L value, the more jet the color is considered to be.

TABLE 1

Gel Coat Data

| Example | Filler Type | Color (L-Value) | Buff-back Gloss |
|---|---|---|---|
| Comp. Ex. 10 | None | 6.08 | 88.1 |
| Comp. Ex. 11 | Mineral Filler | 8.71 | 80.1 |
| Comp. Ex. 12 | Crushed Filler, Comp. Ex 1 | 6.07 | 88.2 |
| Comp. Ex. 13 | Masawaki Filler, Comp. Ex. 2 | 9.51 | 80.9 |
| Invent. Ex. 14 | Inventive Ex 3, Typical Embodiment | 6.31 | 87.4 |
| Invent. Ex. 15 | Inventive Ex. 4, Low Silica | 6.72 | 85.4 |
| Invent. Ex. 16 | Inventive Ex. 5, High Silica | 7.07 | 84.6 |
| Invent. Ex. 17 | Inventive Ex. 6, Low Solids | 6.34 | 86.5 |
| Invent. Ex. 18 | Inventive Ex. 7, High Solids | 6.13 | 86.2 |
| Invent. Ex. 19 | Inventive Ex. 8, AIBN Initiator | 6.64 | 86.3 |
| Invent. Ex. 20 | Inventive Ex. 9, Monomer Only | 6.44 | Not Tested |

Discussion

Particles prepared as described in US 2003/0114622 (Comparative Example 2) exhibited opacity and had a deleterious effect on the color of the black gel coat of Comparative Example 13 prepared with the particles. This color effect is sufficient to cause difficulty in preparing gel coats in a wide array of colors using the opaque particles. The addition of the fumed silica thickener according to the invention, produced transparent particles that yielded a gel coat of the same jetness as the mechanically-crushed particles described in US 2008/0160307.

When gel coated composites are repaired, the final step is to polish or buff the surface to high gloss. Capacity for high buff-back gloss is thus a desirable feature of a gel coat. Table 1 illustrates that the buff-back gloss of gel coats with no filler is excellent. The addition of mineral fillers reduces buff-back gloss. The use of crushed organic fillers yields high buff-back gloss, but spherical organic fillers prepared by techniques previously known in the art give reduction in buff-back gloss. Surprisingly, spherical organic fillers of the invention produce buff-back gloss similar to no filler or to crushed organic filler.

It should be appreciated that the detailed description is intended to encompass numerous embodiments. For example, embodiments relate to a method of preparing a powdered resin filler, comprising: a) combining a thermosetting ethylenically-unsaturated curable composition, a surfactant, a curing agent, and a hydrophilic resin modifier to form a resin blend composition; b) dispersing the resin blend composition in an aqueous medium to form an oil-in-water emulsion or dispersion; c) curing the oil-in-water emulsion dispersion to form a particle slurry; and d) drying the particle slurry to a powder form comprising resin particles having a mean particle size of 1 to 20 µm. In embodiments, the hydrophilic resin modifier resin modifier is hydrophilic fumed silica. In embodiments, the resin particles are transparent. In embodiments, the resin particles are substantially spherical shaped. In embodiments, the method further comprises, after drying the particle slurry, reducing the size of the particles. In embodiments, the cure of the aqueous emulsion or dispersion is initiated at 0 to 64° C. In embodiments, drying the particle slurry is at a temperature of 50 to 150° C. for 2 to 60 hours.

Other embodiments relate to a powdered filler. In embodiments, the powdered filler consists essentially of cured resin particles having a mean particle size of 1 to 20 µm; wherein the resin particles are the reaction product of a resin blend composition comprising: A) a thermosetting ethylenically-unsaturated curable composition, B) surfactant, C) hydrophilic resin modifier, and D) curing agent. In embodiments, the hydrophilic resin modifier resin modifier is hydrophilic fumed silica. In embodiments, the resin blend composition comprises: A) 75 to 98 Wt. % ethylenically-unsaturated thermosetting composition, B) 0.5 to 5 Wt. % surfactant, C) 0.5 to 12 Wt. % hydrophilic resin modifier, and D) 0.5 to 5 Wt. % curing agent, the Wt. % based on the total weight of the resin blend composition. In embodiments, the resin particles are translucent. In embodiments, the resin particles are substantially spherical shaped. In other embodiments the powdered filler consists essentially of cured resin particles, the particles comprising: a cured thermoset composition and a hydrophilic resin modifier, wherein the cured resin particles are spherical-shaped, transparent, and have a mean particle size of 1 to 20 µm. In embodiments, the hydrophilic resin modifier resin modifier is hydrophilic fumed silica.

Further embodiments relate to a gel coat composition, comprising: solid resin particles dispersed in a resin matrix, the solid resin particles having a mean particle size of 1 to 20 µm; the solid resin particles comprising a cured thermoset composition and a hydrophilic resin modifier, wherein the solid resin particles are visually non-differentiable from the resin matrix. In embodiments, the gel coat composition has an L value of 6 to 7.2. In embodiments, the hydrophilic resin modifier resin modifier is hydrophilic fumed silica.

Other embodiments relate to a method of preparing a gel coat composition. In an embodiment, the method comprises combining 50 to 99 Wt. % gel coat composition and 1 to 50 Wt. % of the powder filler of the invention, based on the total weight of the gel coat composition.

Further embodiments relate to a method of preparing a gel coated article. In an embodiment, the method comprises: A.) Applying a layer of a gel coat composition to a surface of a mold, the gel coat composition comprising a resin matrix with the powder filler as disclosed herein being dispersed within the resin matrix; B.) Allowing the gel coat composition to partially cure; C.) Applying a composite material and laminating resin onto the layer of the partially cured gel coat composition; D.) Allowing the gel coat composition and laminating resin to cure within the mold to form a composite article having a surface coated with the cured gel coat; and E.) Removing the gel coated article from the mold; wherein the resin particles of the powder filler in the gel coat are visually non-differentiable from the resin matrix of the cured gel coat. In embodiments, the L value of the gel coat is 6 to 7.2.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required or essential feature or element of any or all of the claims.

What is claimed:

1. A method of preparing a powdered resin filler, comprising:
   a) combining a thermosetting ethylenically-unsaturated curable composition, a surfactant, a curing agent and a hydrophilic resin modifier to form a resin blend composition, wherein the hydrophilic resin modifier is 0.5 to 12 Wt. % of the resin blend composition;
   b) dispersing the resin blend composition in an aqueous medium to form an oil-in-water emulsion or dispersion;
   c) curing the oil-in-water emulsion or dispersion to form a particle slurry; and
   d) drying the particle slurry to a powder form comprising resin particles having a mean particle size of 1 to 20 µm.

2. The method of claim 1, wherein the hydrophilic resin modifier is hydrophilic fumed silica.

3. The method of claim 1, wherein the resin particles are transparent.

4. The method of claim 1, wherein the resin particles are substantially spherical shaped.

5. The method of claim 1, further comprising, after drying the particle slurry, reducing the size of the particles.

6. A powdered filler, consisting essentially of cured resin particles having a mean particle size of 1 to 20 µm, wherein the resin particles are the reaction product of curing a resin blend composition in an oil-in-water emulsion or dispersion comprising:
   A. a thermosetting ethylenically-unsaturated curable composition;
   B. surfactant;
   C. hydrophilic resin modifier; and
   D. curing agent;
   wherein the hydrophilic modifier resin is 0.5 to 12 Wt. % of the resin blend composition;
   wherein the thermosetting ethylenically-unsaturated curable composition is in an amount greater than the hydrophilic resin modifier.

7. The powdered filler of claim 6, wherein the hydrophilic resin modifier is hydrophilic fumed silica.

8. The powdered filler of claim 6, wherein the resin blend composition comprises:
   A. 75 to 98 Wt. % ethylenically-unsaturated thermosetting composition;
   B. 0.5 to 5 Wt. % surfactant;
   C. 0.5 to 12 Wt. % hydrophilic resin modifier; and
   D. 0.5 to 5 Wt. % curing agent; the Wt. % based on the total weight of the resin blend composition.

9. The powdered filler of claim 6, wherein the resin particles are translucent.

10. The powdered filler of claim 6, wherein the resin particles are substantially spherical shaped.

11. A powdered filler consisting essentially of cured resin particles, the particles comprising:
    a cured thermoset composition comprising the reaction product of curing a resin blend composition in an oil-in-water emulsion or dispersion, wherein the resin blend comprises a thermosetting ethylenically-unsaturated curable composition and a hydrophilic resin modifier;
    wherein the cured resin particles are spherical-shaped, transparent, and have a mean particle size of 1 to 20 µm;
    wherein the cured thermosetting ethylenically-unsaturated curable composition is in an amount greater than the hydrophilic resin modifier, and wherein the hydrophilic resin modifier is 0.5 to 12 Wt. % of the resin blend composition.

12. The powdered filler of claim 11, wherein the hydrophilic resin modifier is hydrophilic fumed silica.

13. A gel coat composition, comprising:
    the powdered filler of claim 8 dispersed in a resin matrix;
    wherein the resin particles are visually non-differentiable from the resin matrix.

14. A gel coat composition of claim 13 with an L value of 6 to 7.2.

15. The gel coat composition of claim 13, wherein the hydrophilic resin modifier is hydrophilic fumed silica.

16. A method of preparing a gel coat composition, comprising combining 50 to 99 Wt. % gel coat composition and 1 to 50 Wt. % of the powdered filler of claim 11, based on the total weight of the gel coat composition.

17. A method of preparing a gel coated article, comprising:
    A. Applying a layer of a gel coat composition to a surface of a mold, the gel coat composition comprising a resin matrix with the powdered filler of claim 11 dispersed therein;
    B. Allowing the gel coat composition to partially cure;
    C. Applying a composite material and laminating resin onto the layer of the partially cured gel coat composition;
    D. Allowing the gel coat composition and laminating resin to cure within the mold to form a composite article having a surface coated with the cured gel coat; and
    E. Removing the gel coated article from the mold;
    wherein the resin particles of the powder filler in the gel coat are visually non-differentiable from the resin matrix of the cured gel coat.

18. The method of preparing a gel coated article of claim 17, wherein the L value of the gel coat is 6 to 7.2.

19. The powdered filler of claim 8, wherein the hydrophilic resin modifier is 2 to 5 Wt. % of the resin blend composition.

20. The gel coat composition of claim 13, further comprising a black pigment.

* * * * *